United States Patent [19]

Tate

[11] Patent Number: 5,036,658

[45] Date of Patent: Aug. 6, 1991

[54] PRESSURE RELIEF DEVICE FOR SOLID PROPELLANT MOTORS SUBJECTED TO HIGH EXTERNAL TEMPERATURES

[75] Inventor: John M. Tate, Arab, Ala.

[73] Assignee: The United States of America as represented by the Secretary of the Army, Washington, D.C.

[21] Appl. No.: 488,179

[22] Filed: Mar. 5, 1990

[51] Int. Cl.⁵ .............................................. F02K 1/00
[52] U.S. Cl. ........................................ 60/253; 60/39.1
[58] Field of Search ........... 60/253, 271, 39.1, 39.091, 60/223; 102/481

[56] References Cited

U.S. PATENT DOCUMENTS

| | | | |
|---|---|---|---|
| 2,958,184 | 11/1960 | Sanders | 60/253 |
| 2,958,185 | 11/1960 | Sanders | 60/39.091 |
| 3,134,222 | 5/1964 | Maxon | 60/39.091 |
| 3,613,374 | 10/1971 | Ritchey | 60/253 |
| 3,887,991 | 6/1975 | Panella | 60/223 |
| 4,423,683 | 1/1984 | Telmo | 102/481 |

Primary Examiner—Louis J. Casaregola
Assistant Examiner—John A. Savio, III
Attorney, Agent, or Firm—Freddie M. Bush

[57] ABSTRACT

A rocket motor that has a solid propellant with closure means that is secured to the rocket motor housing by heat responsive means that melts before the solid propellant ignites to prevent the rocket motor from becoming propulsive when subjected to excessive external heat sufficient to cause the rocket propellant to ignite.

3 Claims, 1 Drawing Sheet

U.S. Patent
Aug. 6, 1991
5,036,658
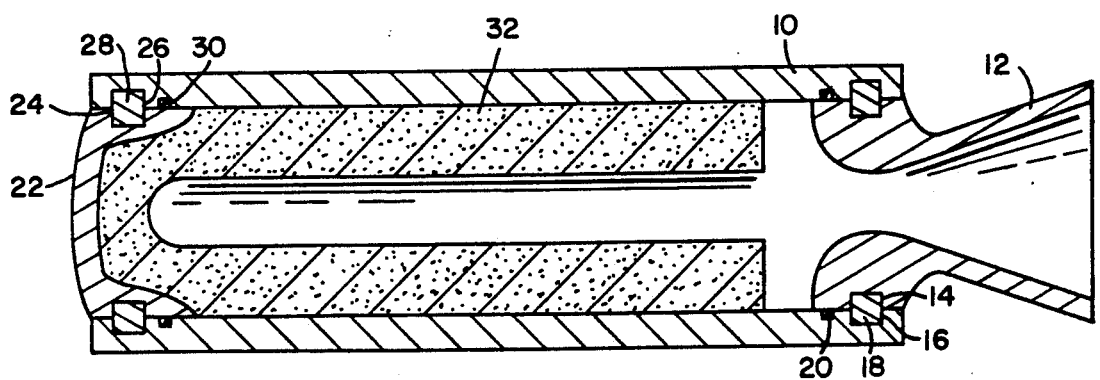

PRESSURE RELIEF DEVICE FOR SOLID PROPELLANT MOTORS SUBJECTED TO HIGH EXTERNAL TEMPERATURES

DEDICATORY CLAUSE

The invention described herein may be manufactured, used, and licensed by or for the Government for governmental purposes without the payment to me of any royalties thereon.

BACKGROUND OF THE INVENTION

A basic problem in shipping and storing of solid propellant rocket motors exist in that if the rocket motor solid propellant is ignited, the rocket motor becomes propulsive. Examples of external heating of the rocket motor to the point of setting off the solid propellant include aircraft fuel fires, railroad car fires, assembly line fires, and etc.

Therefore, it is an object of this invention to provide a means for disabling the solid propellant rocket motor so that it is non-propulsive if the rocket motor propellant is ignited by excessive external heat.

Another object of this invention is to provide heat responsive key means that disables the rocket motor from being propulsive when subjected to excessive external heat.

Still another object of this invention is to provide a key means for the rocket motor in which the key means is made of a low temperature melting alloy that is easily cast in place and can be installed in a minimum amount of time and at low cost.

Other objects and advantages of this invention will be obvious to those skilled in this art.

SUMMARY OF THE INVENTION

A solid propellant rocket motor that has a pressure relief device for preventing build up of pressure within the rocket motor chamber when subjected to high external temperature by providing end closures with one or both of the end closures secured in position by low melting point alloy that will melt at a temperature that is below the ignition temperature of the solid propellant of the rocket motor.

BRIEF DESCRIPTION OF THE DRAWING

The single FIGURE of the drawing is a sectional view illustrating a rocket motor with end closures that are secured thereto in accordance with this invention.

DESCRIPTION OF THE PREFERRED EMBODIMENT

Referring now to the drawing, a rocket motor case 10 has a conventional rocket motor closure nozzle 12 mounted at one end by a groove 14 in the outer periphery of a portion of nozzle 12, by groove 16 in housing 10 and by low melting point alloy material 18 mounted between grooves 14 and 26 to secure nozzle 12 relative to rocket motor housing 10. A conventional o-ring type seal 20 is provided for sealing at the periphery of rocket motor nozzle 12. The opposite end of rocket motor housing 10 has an end closure 22 with a groove 24 in the periphery thereof and rocket motor housing 10 has a groove 26 adjacent groove 24 with a low melting alloy 28 mounted for securing end closure 22 relative to rocket motor housing 10. An o-ring type seal 30 is provided for sealing end closure 22 relative to rocket motor housing 10. A conventional type rocket motor solid propellant 32 is mounted in rocket motor housing 10 in a conventional manner. Alloy materials 18 and 28 are selected to have a melting point that is slightly below the ignition temperature of solid propellant 32 so that low melting point alloy 18 or 28 will melt before solid propellant 32 is ignited to cause build up of pressure in the rocket motor. By providing low melting point alloy 18 or 28, when the rocket motor is subjected to external high temperatures, low melting point alloy 18 and/or 28 will melt and prevent solid propellant 32 from producing thrust from the rocket motor if the solid propellant is ignited. Low melting point alloys 18 and/or 28 can be selected from alloys such as Corro 2405, 2581, etc. from Belmont Metal Products. Col, P.O. Box 388; Bellefonte, Pa. 16823. These alloys generally contain such metals as bismuth, lead cadmium and tin and have a melting point of about 280° Fahrenheit. Low melting point alloys 18 and 28 are mounted in their respective groove by casting the alloy material through an opening or openings in housing 10 or by any other conventional manner.

I claim:

1. A rocket motor comprising a housing with a solid propellant mounted therein, said housing having a first groove extending into and around an internal surface which is void of said solid propellant at one of said housing, said housing having a second groove extending into and around an internal surface void of said propellant at the other end of said housing; closure means having a groove extending into and around the periphery of an external surface, said groove being in an adjacent position when installed to said first groove of said housing; heat responsive means mounted in said first groove of said housing and said groove of said closure means for securing the closure means to the housing; and a rocket motor nozzle having a groove extending into and around the periphery of an external surface, said groove being in an adjacent position when installed to said second groove of said housing; heat responsive means mounted in said second groove of said housing and said groove of said rocket nozzle for securing said rocket motor nozzle to said other end of said rocket motor housing, said heat responsive means having a melting point that is lower than the ignition point of said solid propellant so that when said housing is subjected to excessive external temperature, said heat responsive means will release said closure means and said rocket motor nozzle to prevent pressure build up in the motor housing, wherein said heat responsive means is a metal alloy and is contained in said groove of said closure means, in said groove of said rocket motor nozzle, and in said first groove and said second groove of said rocket motor housing with the grooves of the rocket motor housing, the rocket nozzle, and the closure means being filled with said metal alloy.

2. The rocket motor as set forth in claim 1, wherein said rocket motor nozzle and said housing have seal means for sealing the rocket motor nozzle relative to the housing.

3. The rocket motor as set forth in claim 2, wherein said closure means and said housing have seal means for sealing said closure means relative to said housing.

* * * * *